United States Patent [19]

Kamata et al.

[11] Patent Number: 5,266,780
[45] Date of Patent: Nov. 30, 1993

[54] HUMAN ERROR PREVENTING SYSTEM USING BAR CODE READING COLLATIONS

[75] Inventors: Nobuaki Kamata, Nagoya; Yoshiharu Masai, Nara, both of Japan

[73] Assignee: Kansai Paint Company, Limited, Hyogo, Japan

[21] Appl. No.: 740,775

[22] Filed: Aug. 6, 1991

[30] Foreign Application Priority Data

Aug. 10, 1990 [JP] Japan .................. 2-212936

[51] Int. Cl.⁵ .................. G06F 15/21; G06K 7/10
[52] U.S. Cl. .................. 235/375; 235/376; 235/462; 364/479; 364/401; 340/825.3
[58] Field of Search ............ 235/375, 376, 462; 364/479, 401, 413.01; 221/2; 340/825.3, 825.06; 141/192

[56] References Cited

U.S. PATENT DOCUMENTS

| | | | |
|---|---|---|---|
| 4,476,381 | 10/1984 | Rubin | 235/375 |
| 4,704,517 | 11/1987 | Campisi et al. | 235/375 |
| 4,853,521 | 8/1989 | Claeys et al. | 235/375 |
| 4,877,948 | 10/1989 | Krueger | 235/454 |
| 5,083,591 | 1/1992 | Edwards et al. | 364/479 |

FOREIGN PATENT DOCUMENTS 2570848 3/1986 France .................. 364/401

Primary Examiner—Donald T. Hajec
Assistant Examiner—Esther Chin
Attorney, Agent, or Firm—Armstrong, Westerman, Hattori, McLeland & Naughton

[57] ABSTRACT

The invention provides a human error preventing system wherein a worker is provided with a work slip indicating data as to the work to be performed in a form readable by the worker and with a work instruction bar code representing the work data. The worker performs the work and is provided with a result representing bar code representing the result of work performed by the worker with reference to the work slip. The worker uses a bar code reader to read the result representing bar code and the work instruction bar code. The reading signals from the bar code reader are transferred to a work control computer. The work control computer collates the work instruction bar code and result representing bar code reading signals and the worker is notified whether the result of collation is appropriate.

8 Claims, 3 Drawing Sheets

HUMAN ERROR PREVENTING SYSTEM USING BAR CODE READING COLLATIONS

FIELD OF INDUSTRIAL APPLICATION

The present invention relates to a human error preventing system for enabling workers to perform one kind or a plurality of kinds of work without errors.

PRIOR ART AND PROBLEM THEREOF

For example, additives and auxiliary agents for use in preparing coating compositions serve the important function of greatly governing the quality of the product even if added in small amounts, whereas it is difficult to quantitatively determine such agents in order to check whether they are properly added. Accordingly, errors, if involved in the addition procedure, greatly impair the quality of the product, but it is almost impossible to trace the error. It is therefore extremely important to execute the addition procedure free of errors.

Although it is important for the worker to exercise greater care from the viewpoint of work control, the work can not be assured of sufficient reliability only by increased care. Thus, it has been strongly desired to provide a work control system capable of completely or nearly completely obviating work errors.

Prevention of human errors such as work errors attributable to workers has become a critical problem in many fields involving more sophisticated techniques of greater complexity.

The main object of the present invention is to meet these demands and to provide a work control system capable of completely or almost completely eliminating work errors and like human errors.

SUMMARY OF THE INVENTION

The above object of the present invention is fulfilled by a human error preventing system comprising the steps of:
  providing a worker with a work slip indicating data as to the work to be performed in a form readable by the worker and with a work instruction bar code representing the work data,
  causing the worker to perform the work and providing the worker with a result representing bar code representing the result of work performed by the worker with reference to the work slip,
  causing a bar code reader by the worker to read the result representing bar code and the work instruction bar code and transferring the reading signals to a work control computer, and
  collating the work instruction bar code and result representing bar code reading signals by the work control computer and notifying the worker whether the result of collation is appropriate.

In the case where the work includes a plurality of operations, it is desired that work data as to the plurality of operations be indicated on the work slip and represented by the work instruction bar code, and that the step of working by the worker and providing the result representing bar code through the collation result notifying step be executed in succession for each of the operations.

To accomplish the above object, the present invention further provides a human error preventing system in a work including a procedure for selecting at least one specified material from a plurality of materials and a procedure for placing the selected material into at least one specified container, said human error preventing system comprising the steps of:
  providing a worker with a work slip indicating data as to the work to be performed in a form readable by the worker and with a work instruction bar code representing the work data,
  providing the worker with a result representing bar code representing the result of selection by the worker of the specified material from the plurality of materials with reference to the work slip,
  causing a bar code reader by the worker to read the result representing bar code and the work instruction bar code and transferring the reading signals to a work control computer,
  collating the work instruction bar code and result representing bar code reading signals by the work control computer and notifying the worker whether the result of collation is appropriate, and
  indicating to the worker the container for the worker to place the selected material in.

The human error preventing system of the present invention has the following advantages.

Items of bar code data are read from the work instruction bar code representing work data and the result representing bar code representing the result of work performed by the worker with reference to the work slip, and are then collated by the work control computer, so that when the result of work is encoded into a bar code for every working procedure and checked with the work instruction bar code, the worker can recognize at the work site whether the work has been done properly. This makes it possible to completely or almost completely eliminate work errors or like human errors without resorting only to the care to be exercised by the worker.

In the case where the work includes a plurality of operations, work data as to the plurality of operations is indicated on the work slip and represented by the work instruction bar code, and the step of providing the worker with the result representing bar code through the step of notifying the result of collation are performed in succession for every operation, whereby the operations can be carried out reliably free of human errors.

Further in a work including a procedure for selecting at least one specified material from a plurality of materials and a procedure for placing the selected material into at least one specified container, the result of selection of the material by the worker is encoded into a result representing bar code, and the signals obtained by reading the work instruction bar code and the result representing bar code are collated by the work control computer to notify the worker whether the result of collation is appropriate. The container for the worker to place the material in is further indicated to the worker. It is then possible to perform the work from the selection of the material through the placement of the material into the container reliably free from human errors.

The present invention will become more apparent from the following description of an embodiment with reference to the drawings. The invention is not limited to the embodiment but can be modified variously within the scope of the appended claims.

EMBODIMENT

Figure 1:
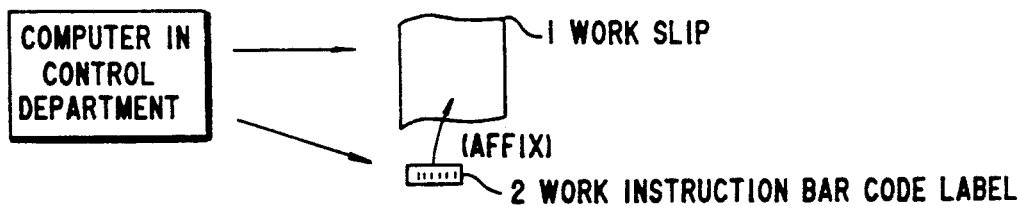
FIG. 1 is a diagram illustrating a work process according to a human error preventing system embodying invention.
Figure 1:
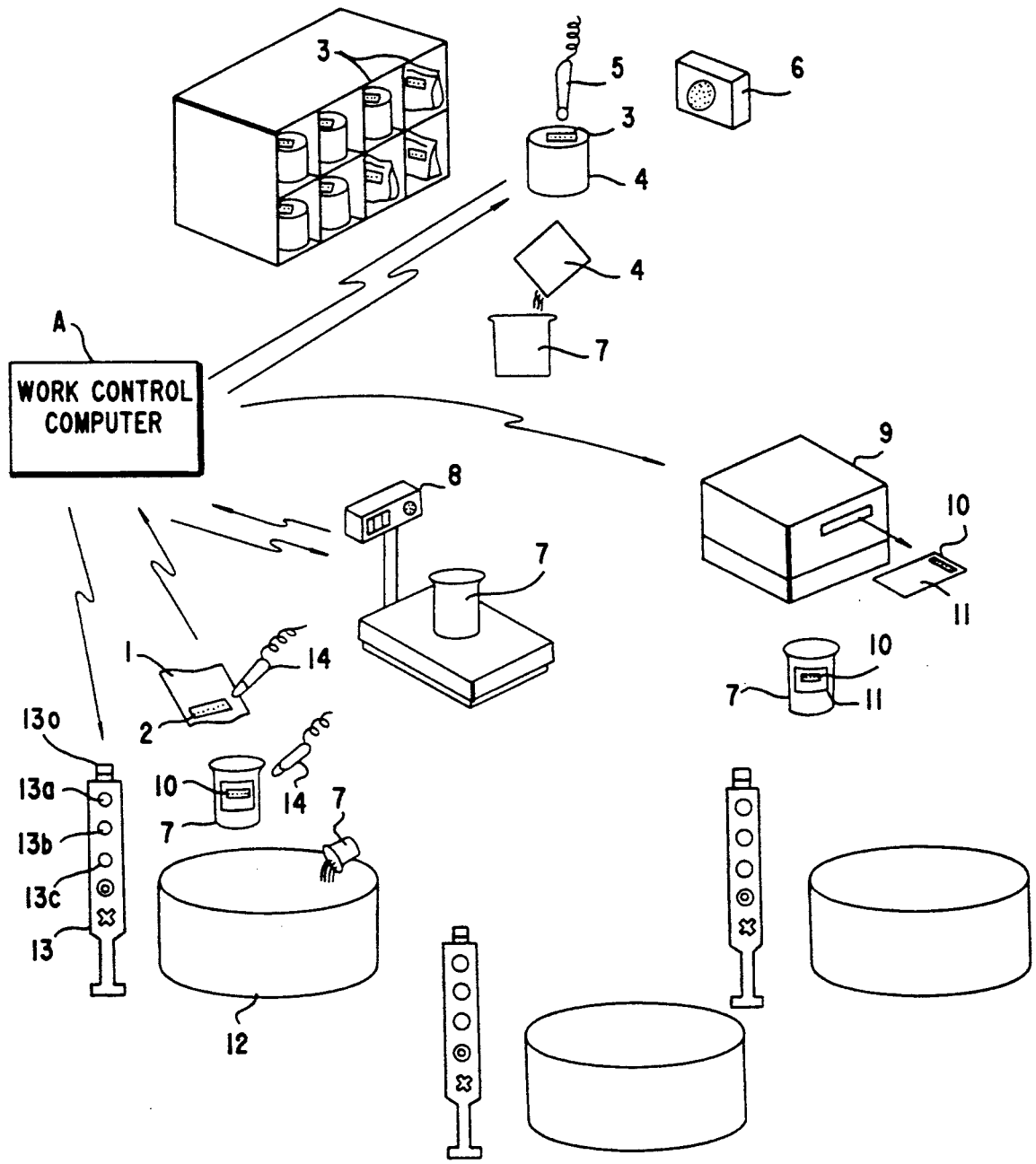
Figure 2:
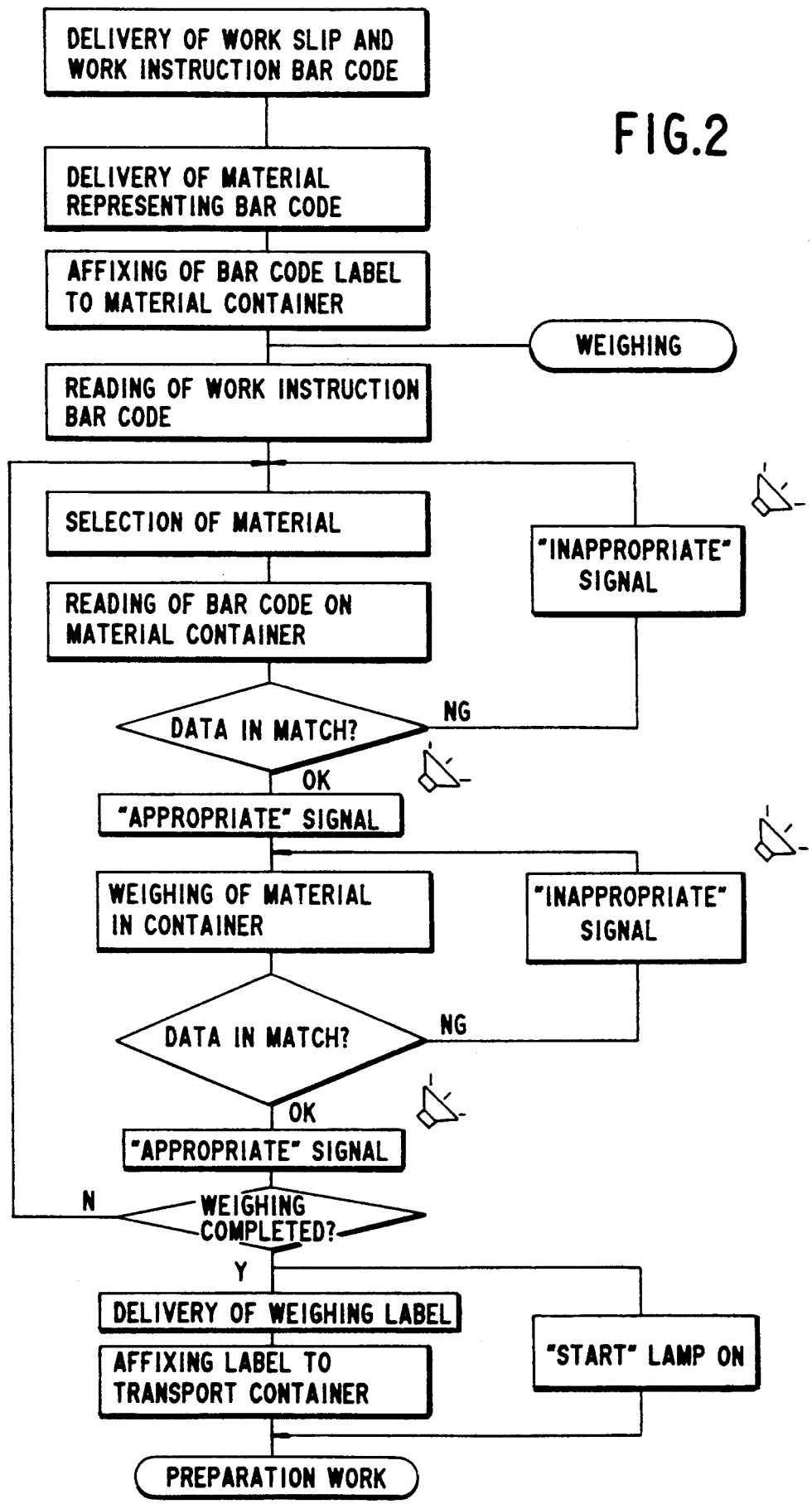
FIGS. 2 and 3 are flow charts of the work process.
Figure 3:
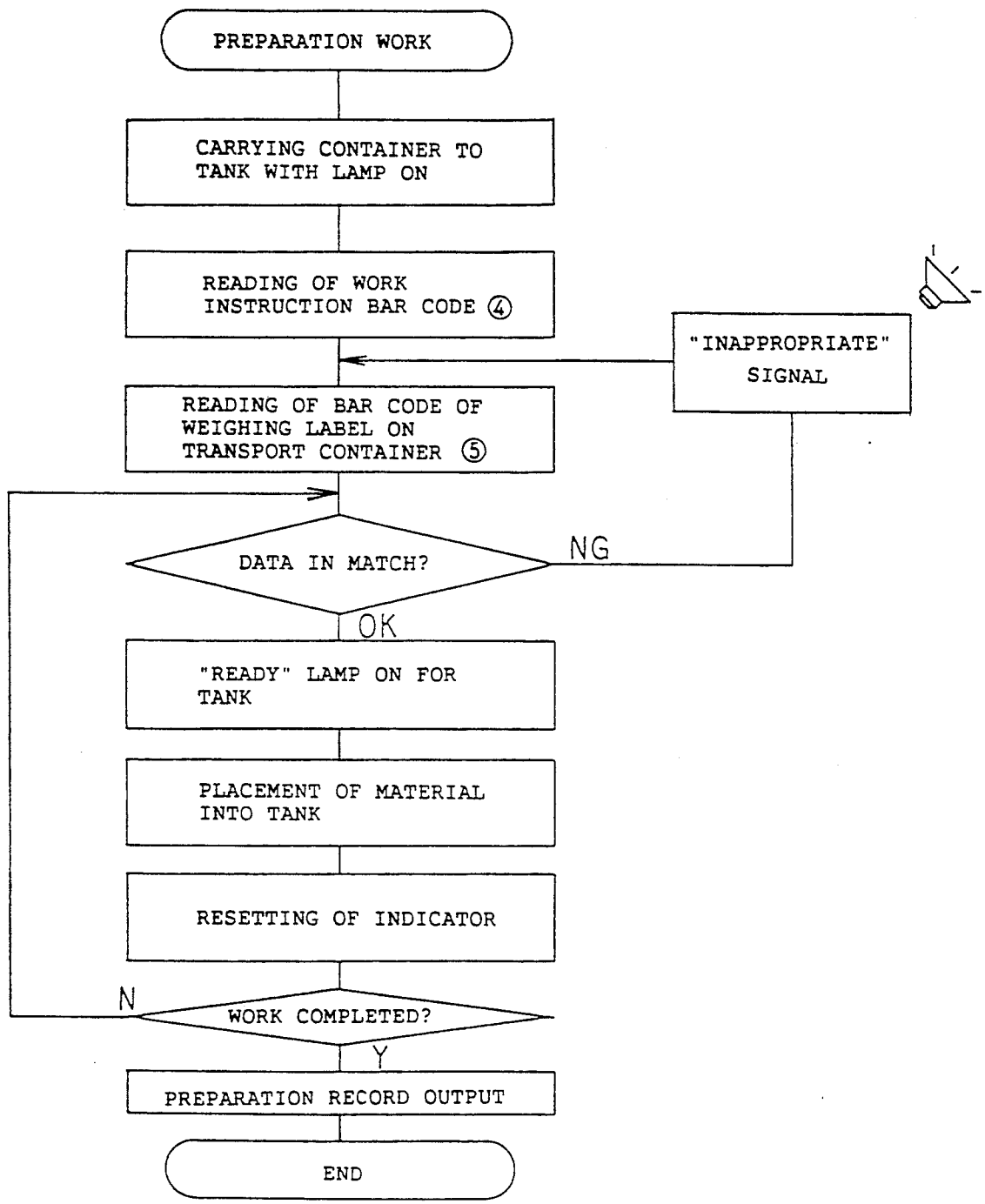

FIG. 1 is a diagram schematically showing a process for preparing a coating composition, and FIGS. 2 and 3 are flow charts thereof.

First, work data for preparing the coating composition is determined based on a production program. The data includes names of additives, amounts thereof to be added, names of tanks for containing the additives, order of addition, etc. (Depending on the process, the work data further includes other items, such as the names of resin varnishes, solvents, pigments, etc.) The work data is expressed on a work slip 1 readable by the worker and represented by a work instruction bar code 2 and given to the worker. A label bearing the bar code 2 is affixed to the work slip 1. Alternatively, the data may be printed out as the work slip and the bar code at the same time by a page printer or the like. Further a bar code 3 representing an additive is affixed to a container 4 containing the additive.

The worker selects the specified additive with reference to the work slip 1, and causes a bar code reader 5 to read the work instruction bar code on the work slip and the bar code 3 on the container containing the specified additive at the site. The items of data read from the two bar codes are transferred to a work control computer A in a production department and collated. In accordance with whether the result of collation is appropriate, a sound signal is given from a speaker, immediately notifying the worker whether the additive selected is appropriate. If the selection is in error, the proper additive is reselected, followed by reading by the bar code reader and notification with a sound signal.

When correct selection has been made, the worker transfers a predetermined amount of the selected additive to a material transport container 7 and measures out the amount by a weighing device 8. The result of measurement is sent to the work control computer A and compared with the corresponding data from the work intruction bar code. Based on the result of comparison, the work control computer indicates whether the measurement is appropriate and/or whether it is excessive or insufficient, thus immediately notifying the worker of the result. The worker finishes weighing out the proper amount by correcting the excess or insufficiency. In the case where a plurality of additives are used, the above steps of selection of the additive through weighing are repeated for each additive.

After the predetermined amount of the specified additive has been weighed out, the worker feeds a weighing completion signal to the work control computer, which in turn delivers a weighing label 10 from a printer 9 at the weighing station. The weighing label 10 is delivered for each additive and indicates the name of additive and the name of destination tank which are printed with reference to the data on the work slip, and the weighing result transferred from the weighing device, these items of data being printed in both characters and a bar code 11. The worker affixes the weighing label 10 to the material transport container 7. In addition to the delivery of the weighing label 10, the work control computer A feeds a signal to an indicator 13 disposed in the vicinity of the tank 12 into which the additive is to be placed, turning on a lamp $13_0$ and indicating the tank to the worker.

The worker carries the material transport container to the location of the tank with the lamp $13_0$ turned on, where the worker causes a bar code reader 14 to read the work instruction bar code 2 again, whereupon the computer A feeds a signal to the indicator 13 to turn off the lamp $13_0$ and turn on a lamp $13a$ indicating "START." Next, the worker causes the bar code reader 14 to read the bar code 11 on the weighing label affixed to the material transport container. The item of data thus read and the item of data read from the work instruction bar code previously are collated by the work control computer A. If the result of collation is not appropriate, a signal to that effect is given for the worker to handle a proper material transport container. When the result of collation is appropriate, a lamp $13b$ indicating "READY" is alternatively turned on in response to a command from the computer, whereupon the worker places the additive into the tank 12 from the container 7. The worker thereafter depresses a work completion button. The work control computer then checks whether there is any other unfinished preparation work. If there is any, a lamp $13c$ indicating "UNFINISHED" on the indicator 13 alternatively goes on. If otherwise, the indicator 13 is turned off, whereby the preparation work is completed.

The above work can be conducted for required tanks, and when the required number of preparation operations have been completed, a record of preparation operations stored in the work control computer can be collectively output. This makes it possible to output the work results, for example, per day or per month.

The present invention can be practiced in various modes. A simple mode will be described below with reference to an example of preparing a coating composition.

In the case where many additives are to be placed into specified tanks individually, the worker is provided with a work slip indicating the names of the additives and readable by the worker and with a work instruction bar code including bar codes representing the names of the additives. Labels bearing bar codes representing additives are each affixed in advance to an additive containing container concerned.

Before starting to select the specified additives, the worker causes a bar code reader to read the work instruction bar code. The data is sent to a work control computer. Next, the worker selects one of the specified additives with reference to the work slip, and causes the bar code reader to read the bar code on the container containing the additive. The bar code data on the container is also sent to the computer and is checked with the data of the work instruction bar code already transferred to the computer. In accordance with whether the result of checking or collation is appropriate, a signal is emitted from a speaker, immediately notifying the worker whether the proper additive has been selected. If the selection is in error, the proper additive is reselected. The worker thereafter selects another one of the specified additives, followed by reading of the bar code on the container, and collation and notification of the collation result by the computer. Thus, the use of bar codes enables the worker to rapidly and objectively recognize whether each of the specified additives has been properly selected, whereby the errors to be otherwise involved in selection can be reliably obviated.

The present system is usable for a wide variety of other applications, for example, for preparing chemical products such as synthetic rubbers, inks and synthetic resins, for preparing pharmaceuticals or cosmetics and for food processing.

What is claimed is:

1. A method for preventing human error in performing a procedure, comprising the steps of:
   (a) providing a work slip to a worker indicating work data as to procedure to be performed in a human readable form and with a work instruction bar code representing the work data,
   (b) the worker performing the procedure in reference to the work slip,
   (c) providing a result representing bar code representing the result of the procedure performed by the worker with reference to the work slip,
   (d) the worker causing a bar code reader to read the result representing bar code and the work instruction bar code,
   (e) transferring reading signals from the bar code reader to a work control computer,
   (f) the work control computer collating the work instruction bar code and result representing bar code reading signals, and
   (g) notifying the worker whether the result of collation is appropriate.

2. A method as defined in claim 1, wherein the procedure includes a plurality of operations, the work data as to the plurality of operations being indicated on the work slip and represented by the work instruction bar code, and steps (b) to (g) are executed in succession for each of the operations.

3. A method as defined in claim 1, wherein the procedure includes selecting at least one specified material from a plurality of materials, and the result representing bar code includes data as to the result of selection made by the worker with reference to the work slip.

4. A method as defined in claim 1, wherein the procedure further includes measuring an amount of the selected material, and the result representing bar code further includes data as to the measurement of the amount made.

5. A method of preventing human error in a work procedure which includes a procedure for selecting at least one specified material from a plurality of materials and a procedure for placing the selected material into at least one specified container, comprising the steps of:
   (a) providing a work slip to a worker indicating work data as to the work procedure to be performed in a form readable by the worker and with a work instruction bar code representing the work data,
   (b) the worker selecting a specified material from a plurality of materials with reference to the work slip,
   (c) providing the worker with a material representing bar code representing the selected material,
   (d) the worker causing a bar code reader to read the material representing bar code and the work instruction bar code,
   (e) a work control computer collating signals from the bar code reader to step (d),
   (f) notifying the worker if the selected material is appropriate.
   (g) providing the worker with a result representing bar code representing the result of selection by the worker of the specified material from the plurality of materials with reference to the work slip,
   (h) the worker causing a bar code reader to read the result representing bar code and the work instruction bar code,
   (i) transferring reading signals from the bar code reader of step (h) to the work control computer,
   (j) the work control computer collating the work instruction bar code and result representing bar code reading signals of step (i),
   (k) notifying the worker whether the result of collation is appropriate, and
   (l) indicating to the worker the container for the worker to place the selected material in.

6. A method as defined n claim 5, which further comprises the steps of (i) collating data specifying the container to which the worker has access to and data indicating the selected material and given y the result representing bar code by the work control computer and (II) notifying the worker whether the result of collation is appropriate.

7. A method as defined in claim 5, wherein the work procedure includes measuring an amount of the selected material, and the result representing bar code includes data as to the result of the selection and the measurement of the amount made.

8. A method for preventing human error in preparing a composition, comprising the steps of:
   (a) providing a work slip to a worker having human readable work data and a work instruction bar code representing the work data;
   (b) providing at least one container having an additive therein and an additive indicating bar code thereon indicating the additive;
   (c) the worker selecting one of said at least one container and using a bar code reader to read both said additive indicating bar code of the selected container and said work instruction bar code;
   (d) a work control computer collating the signals from the bar code reader of step (c);
   (e) notifying the worker if the container selected is appropriate;
   (f) placing the additive in the container within a transport container;
   (g) measuring the transport container;
   (h) notifying the worker if the measurement is appropriate;
   (i) applying a measurement representing bar code label to the transport container if the measurement is appropriate, the measurement representing bar code label including indication of (1) the additive, (2) a tank destination, and (3) the measurement result;
   (j) indicating the tank designation to the worker;
   (k) the worker using a bar code reader to read the work instruction bar code and to read the measurement representing bar code label;
   (l) the work control computer collating the signals from the bar code reader of step (k);
   (m) notifying the worker if the result of collation is appropriate; and
   (n) the worker placing the additive in the transport container into the designated tank if step (m) indicates that the result of collation is appropriate.

* * * * *